United States Patent
Nozaki et al.

(10) Patent No.: US 6,655,698 B2
(45) Date of Patent: Dec. 2, 2003

(54) SEALING MEMBER HAVING MAGNET

(75) Inventors: Masahiro Nozaki, Aichi-ken (JP); Katsunori Kawai, Aichi-ken (JP)

(73) Assignees: Toyoda Gosei Co., Ltd., Aichi-ken (JP); Takechi Kogyo Gomu Co., Ltd., Ehime-pref. (JP)

(*) Notice: Subject to any disclaimer, the term of this patent is extended or adjusted under 35 U.S.C. 154(b) by 0 days.

(21) Appl. No.: 10/318,143

(22) Filed: Dec. 13, 2002

(65) Prior Publication Data

US 2003/0111802 A1 Jun. 19, 2003

(30) Foreign Application Priority Data

Dec. 14, 2001 (JP) .......................................... 2001-380877

(51) Int. Cl.$^7$ .............................. F16J 15/53; E06B 7/16; B60J 10/08
(52) U.S. Cl. ....................... 277/629; 277/921; 49/478.1; 296/146.9
(58) Field of Search ................................. 277/628, 629, 277/637, 640, 644, 651, 921; 49/478.1, 490.1, 475, 489, 490, 475.1; 296/146.9

(56) References Cited

U.S. PATENT DOCUMENTS

| | | | |
|---|---|---|---|
| 2,855,639 A | * 10/1958 | Korb | 49/478.1 |
| 3,022,550 A | * 2/1962 | Beckett et al. | 49/496.1 |
| 3,147,176 A | * 9/1964 | Haslam | 428/55 |
| 3,378,956 A | * 4/1968 | Parks et al. | 49/478.1 |
| 3,408,772 A | * 11/1968 | Frehse | 49/366 |
| 4,306,379 A | 12/1981 | Linstromberg | |
| 4,535,563 A | * 8/1985 | Mesnel | 49/478.1 |
| 5,257,791 A | 11/1993 | Cittadini et al. | |
| 5,355,628 A | * 10/1994 | Dranchak | 49/483.1 |
| 5,614,052 A | 3/1997 | Fisher | |
| 5,671,967 A | * 9/1997 | Gurganus et al. | 296/146.9 |
| 5,990,218 A | * 11/1999 | Hill et al. | 524/431 |
| 6,131,341 A | 10/2000 | Wade et al. | |
| 6,273,433 B1 | * 8/2001 | Yu | 277/629 |
| 2002/0129558 A1 | * 9/2002 | Baba et al. | 49/498.1 |

FOREIGN PATENT DOCUMENTS

| | | | | |
|---|---|---|---|---|
| JP | 63306917 A | * | 12/1988 | ............. B60J/1/17 |
| JP | 02227324 | * | 9/1990 | ............. B60J/10/04 |
| JP | H-3-82643 | | 4/1991 | |
| JP | 04201716 A | * | 7/1992 | ............. B60J/10/08 |

* cited by examiner

Primary Examiner—Anthony Knight
Assistant Examiner—Vishal Patel
(74) Attorney, Agent, or Firm—Posz & Bethards, PLC

(57) ABSTRACT

A sealing member to be attached along a periphery of a door with a continuous good sealing performance against a facing opening portion even in a corner of the periphery of the door. A bar-shaped magnet is provided in a tubular seal portion of the sealing member so as to extend in a longitudinal direction thereof in close contact with an inside surface of a contacting part of a seal wall, which contacts the facing opening portion. The bar-shaped magnet has a cross-sectional shape of which the width gradually decreases from the side of the contacting part of the seal wall inwardly of the tubular seal portion, thereby reducing the cross-sectional area of the magnet, and enabling the magnet to be readily bent along a corner of the periphery of the door. And the bar-shaped magnet has an outwardly curving contacting surface, which contacts the contacting part of the seal wall, thereby improving contacting properties between the sealing member and a corner of the opening portion.

6 Claims, 2 Drawing Sheets

SEALING MEMBER HAVING MAGNET

CROSS-REFERENCE OF RELATED APPLICATION

This application is related to and claims priority from Japanese patent application No. 2001-380877, incorporated herein by reference.

BACKGROUND OF THE INVENTION

1. Field of the Invention

The present invention relates to a sealing member to be attached along a periphery of a door or an opening portion which is closed and opened by the door and, more particularly, to such a sealing member which has a magnet.

2. Description of Related Art

In order to effect an improved seal around a periphery of a hinged door of a building, household electrical appliance or the like, a sealing member having a magnet is attached along the periphery of the door or a facing opening portion. Examples of such a sealing member are disclosed in publication of unexamined Japanese patent application No. Hei 3-82643, and U.S. Pat. No. 5,614,052. In these examples, a tubular space is formed in a tubular seal portion of the sealing member so as to extend in a longitudinal direction of the tubular seal portion. The tubular space is formed along a seal part of a seal wall of the tubular seal portion, which is to contact and press a facing member when the door is closed. A bar-shaped magnet is accommodated in the tubular space. The bar-shaped magnet is composed of rubber, synthetic resin or the like, to which a magnetic material such as ferrite is added, and has a square (generally, rectangular) cross-sectional shape.

These sealing members are required to have the following characteristics: (a) the bar-shaped magnet exerts a magnetic force enough to attract the facing member, and provides a continuous seal line between the sealing member and the facing member over an entire length of the sealing member; (b) the bar-shaped magnet is lightweight; and (c) upon attaching of the sealing member along a corner of the periphery of the door, for example, the bar-shaped magnet can bend readily in conformity with the configuration of the corner.

The conventional bar-shaped magnet having a square cross-sectional shape, however, has the following problem. The magnet contacts and presses the facing member via the seal wall in a flat surface thereof, and accordingly, the flat surface cannot closely contact the corner of the facing member, thereby generating an interruption of a sealing line between the sealing member and the facing member.

The weight of the square magnet can be reduced and the bending properties thereof can be improved by decreasing the size of the cross-section of the magnet. But, If the size of the magnet is decreased, the contacting area of the magnet against the facing member becomes small, whereby the magnetic attraction thereof becomes insufficient, and the interruption of the sealing line between the sealing member and the facing member is enlarged.

SUMMARY OF THE INVENTION

Accordingly, it is an object of the present invention to provide a sealing member having a magnet which is lightweight and capable of exerting a magnetic force to attract a facing member when the sealing member contacts the facing member.

It is another object of the present invention to provide a sealing member having a magnet which is readily bent when the sealing member is attached along a corner of a door or an opening portion, thereby effecting a continuous seal line between the door and the opening portion.

The sealing member having a magnet in accordance with the present invention includes a base portion, a tubular seal portion which expands from the base portion and is surrounded by a seal wall. The seal wall contacts the opening portion or the periphery of the door in a contacting part upon closing of the door. The sealing member further includes a bar-shaped magnet which is provided in the tubular seal portion so as to extend in a longitudinal direction thereof. The bar-shaped magnet contacts an inside surface of the contacting part of the seal wall. The width of the cross-section of the bar-shaped magnet gradually decreases from the side of the contacting part of the seal wall inwardly of the tubular seal portion.

With the present invention, as compared to the conventional square magnet having the contacting area approximately identical to that of the bar-shaped magnet of the present invention, the cross-sectional area of the magnet can be reduced with the magnetic attraction approximately identical to that of the conventional magnet maintained. Accordingly, the magnet can be made lightweight, and can be readily bent to conform to the corner.

It is preferable to form a contacting surface of the bar-shaped magnet, which contacts the inside surface of the contacting part of the seal wall, into an outwardly curving surface. With this arrangement, when the sealing member is attached along a corner of the door or the facing opening portion, any interruption of a seal line between the sealing member and the facing surface can be prevented.

It is preferable to reduce the thickness of the contacting part of the seal wall, which the magnet contacts, as compared to a remaining part of the seal wall. With this arrangement, the magnetic attraction of the bar-shaped magnet against the facing member can be enhanced.

It is preferable to form a narrow part in about a middle of the tubular seal portion in the height direction thereof, and to provide the bar-shaped magnet in an upper half of the tubular seal portion above the narrow part while providing a plurality of sponge members in the tubular seal portion so as to extend in a longitudinal direction thereof in contact with an inside surface of the seal wall of the tubular seal portion.

With this arrangement, by virtue of the narrow part of the tubular seal portion, the upper half thereof, in which the bar-shaped magnet is provided, can tilt in such a direction as to exert a magnetic attraction on the facing member most strongly. In addition, by virtue of the sponge members provided in the tubular seal portion, undesirable deformation of the upper half of the tubular seal portion can be restrained upon attaching of the sealing member along the corner of the door or the facing opening portion, and the noise-insulating properties and sound-absorbing properties of the sealing member can be improved.

Other objects, features, and characteristics of the present invention will become apparent upon consideration of the following description and the appended claims with reference to the accompanying drawings, all of which form a part of this specification.

DETAILED DESCRIPTION OF THE PREFERRED EMBODIMENTS

Hereinafter, the present invention will be explained based on several embodiments wherein a sealing member having a magnet in accordance with the present invention is attached to a door of a motor vehicle.

Figure 1:
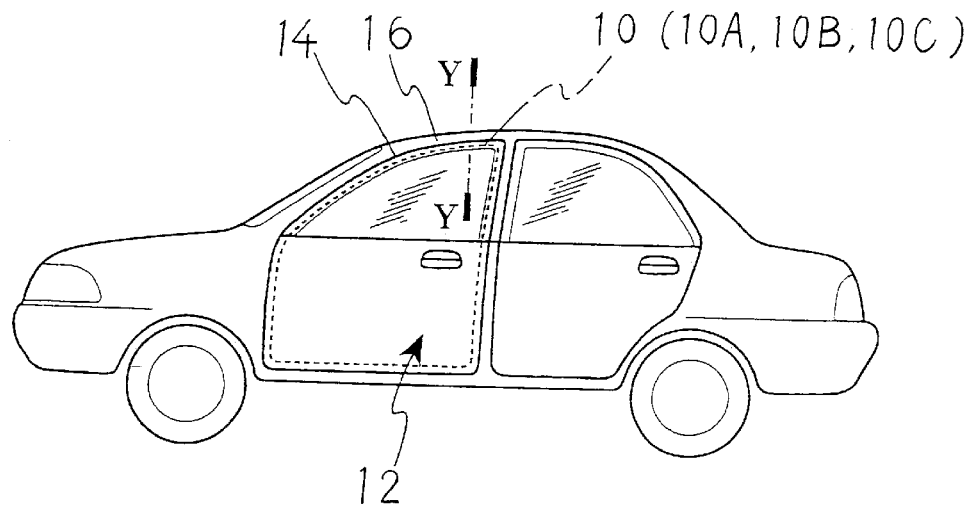
FIG. 1 is a side view of a motor vehicle to which a sealing member having a magnet in accordance with the present invention is attached.

As shown in FIG. 1, a door weather strip 10 as a sealing member is continuously attached along a periphery of a hinged door 12 of a vehicle, which includes a door frame 14 of the door 12. When the door 12 is closed, the door weather strip 10 seals the periphery of the door 12 against a facing opening portion 16 of a vehicle body. The door weather strip 10 is composed of an extruded body of rubber such as ethylene propylene rubber, or thermoplastic olefin elastomer (TPO).

Figure 2:
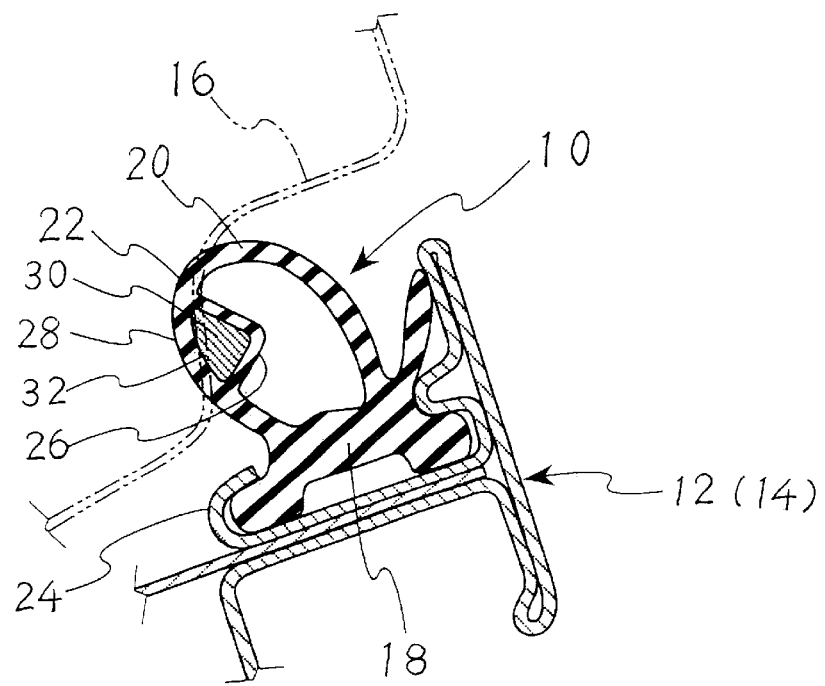
FIG. 2 is a cross-sectional view of one embodiment of a sealing member in accordance with the present invention, which is taken along the line Y—Y of FIG. 1.

In one embodiment shown in FIG. 2, the door weather strip 10 includes a base portion 18 and a tubular seal portion 20. A seal wall 22 of the tubular seal portion 20 expands from the base portion 18. The door weather strip 10 thus arranged is attached to the door 12 by press-inserting the base portion 18 into a retainer 24 which is formed along the periphery of the door 12 (door frame 14 in FIG. 2). When the door 12 is closed, the seal wall 22 contacts and presses the facing opening portion 16 of the vehicle body in a contacting part 28 having an outwardly curving configuration.

A partition wall 26 is formed within the tubular seal portion 20 integrally with the seal wall 22 such that a tubular space is defined by the partition wall 26 and the contacting part 28 of the seal wall 22. The partition wall 26 has a generally V-shaped cross section, and the tubular space defined by these walls has a generally sector-shaped cross-section of which width gradually decreases from the side of the contacting part 28 of the seal wall 22 inwardly of the tubular seal portion 20.

A magnet 30 is accommodated in the tubular space of the door weather strip 10. The magnet 30 has a bar-shaped configuration and is composed of ethylene propylene (EPDM) rubber or thermoplastic olefin elastomer (TPO), to which a magnetic material such as ferrite powder is added. The magnet 30 has a cross-sectional shape conforming to that of the tubular space of the door weather strip 10.

The magnet 30 is provided in the door weather strip 10 by inserting the magnet 30 in the tubular space of the door weather strip 10 which has been previously formed by extrusion. The magnet 30 may be formed integrally with the door weather strip 10 by extrusion. In this case, the productivity of the manufacturing process of the door weather strip 10 having the magnet 30 is improved.

With the present embodiment, since the magnet 30 has a sector-shaped cross-section, the cross-sectional area of the magnet 30 can be decreased, as compared to that of the conventional magnet having a square cross-section. Consequently, the magnet 30 can be made lightweight, and can be readily bent along the corner of the periphery of the door 12, as compared to the case of the conventional magnet. In addition, an outwardly curving contacting surface 32 of the magnet 30 can continuously contact the opening portion 16 via the contacting part 28 of the seal wall 22, whereby a continuous seal line can be formed between the seal wall 22 and the opening portion 16 without generating any interruption therein. Furthermore, the magnet 30 can exert a magnetic force approximately identical to that of the conventional magnet having a square cross-section.

Figure 3:
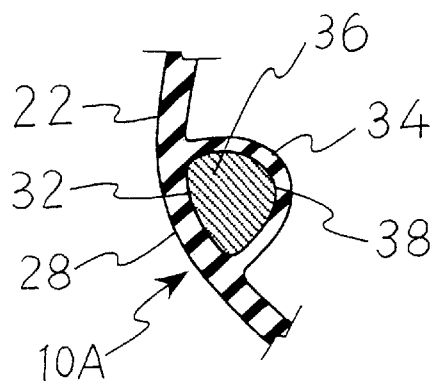
FIG. 3 is a cross-sectional view of a main part of another embodiment of a sealing member in accordance with the present invention.

In another embodiment shown in FIG. 3, a partition wall 34 of a door weather strip 10A has a spread apart U-shaped cross-section, and a magnet 36 has an arc-shaped curving surface 38 which conforms to the partition wall 34. With this arrangement, the cross-sectional area of the magnet 36 can be decreased, as compared to the conventional magnet having a square cross-section, and consequently, the magnet 36 can achieve the operational advantage similar to that of the magnet of the preceding embodiment.

Figure 4:
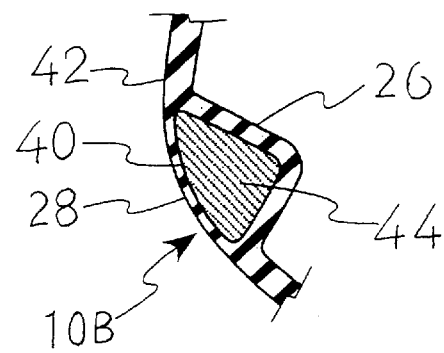
FIG. 4 is a cross-sectional view of a main part of a still another embodiment of a sealing member in accordance with the present invention.

In still another embodiment shown in FIG. 4, a contacting part 40 of a seal wall 42 of a door weather strip 10B is made thinner than the remaining part of the seal wall 42. By virtue of the thin contacting part 40 of the seal wall 42, the magnetic force of a magnet 44 is exerted without being decreased while passing the seal wall 42.

In embodiments shown in FIGS. 3 and 4, parts similar to those in FIG. 2 are given the same reference numerals as therein.

Figure 5:
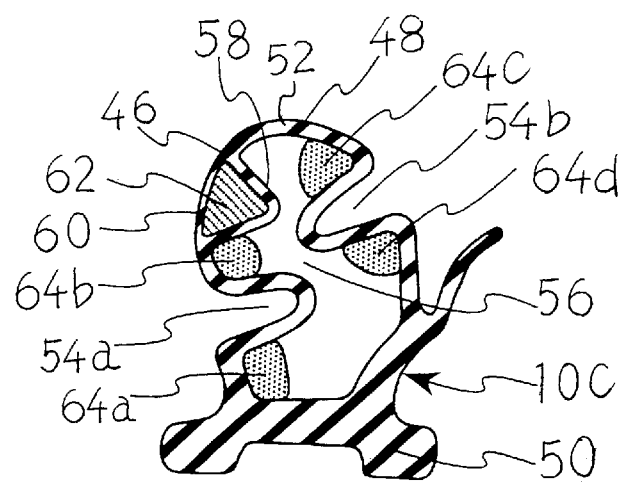
FIG. 5 is a cross-sectional view of a further embodiment of a sealing member in accordance with the present invention, which is taken, similarly to FIG. 2.

In a further embodiment shown in FIG. 5, a seal wall 46 of a tubular seal portion 48 which expands from a base portion 50 of a door weather strip 10C outwardly curves at about a top 52 thereof, and includes depressions 54a and 54b in about the middle in the height direction of the tubular seal portion 48. The depressions 54a and 54b have respectively a generally U-shaped cross-section, and face each other in the width direction of the tubular seal portion 48. The depressions 54a and 54b define a narrow part 56 in about the middle of the tubular seal portion 48. A partition wall 58 having a generally V-shaped cross-section is formed integrally with the outwardly curving seal wall 46, and a contacting part 60 of the seal wall 46 is made thin. A magnet 62 is inserted in a tubular space defined by the partition wall 58 and the thin contacting part 60 of the seal wall 46.

Sponge members 64a, 64b, 64c and 64d are provided within the tubular seal portion 48 over an entire length thereof so as to contact an inside surfaces of projections of the seal wall 46 on both sides of the depressions 54a and 54b. The magnet 62 and the sponge members 64a, 64b, 64c and 64d are formed integrally with the door weather strip 10C by extrusion.

When a hinged door 12 (FIG. 1) is closed, an upper half of the tubular seal portion 48 turns around the narrow part 56 and tilts in such a direction that the magnet 62 exerts a magnetic attraction on the opening portion 16 (FIG. 1) most strongly. Consequently, the magnet 62 contacts and presses the opening portion 16 via the thin contacting part 60 of the seal wall 46 effectively.

The seal wall of the tubular seal portion which has a narrow part in the middle thereof greatly deforms upon bending of the door weather strip along the corner of the periphery of the door.

With the present embodiment, by virtue of the sponge members 64a, 64b, 64c and 64d, the deformation of the seal wall 46 of the tubular seal portion 48 can be restrained, whereby the sealing performance of the door weather strip 10C is prevented from decreasing due to the deformation of the seal wall. In addition, since the sponge members 64a, 64b, 64c and 64d have sound-absorbing properties and noise-insulating properties, they can prevent noise from entering a vehicle compartment from the outside of a vehicle.

The sealing member having a magnet in accordance with the present invention can be widely applied to hinged doors of vehicles other than motor vehicles, buildings, household electrical appliances or the like, or a facing opening portions thereof. The sealing member in accordance with the present invention can exert a sufficient magnetic attraction on a facing member using a magnet which has a reduced cross-sectional area. Accordingly, the magnet can be made lightweight, and can be readily bent along corners of the doors or the facing opening portions. In addition, by forming the magnet to have an outwardly curving contacting surface, a continuous seal line can be effected between the seal wall and the facing member over an entire length of the sealing member, even in corners of the doors or facing opening portions. Furthermore, by providing sponge members in the tubular seal portion of the sealing member, the sound-absorbing properties and the noise-insulating properties of the sealing member can be improved.

While the invention has been described in connection with what are considered to be the preferred embodiments, it is to be understood that the invention is not limited to the disclosed embodiments, but, on the contrary, is intended to cover various modifications and equivalent arrangements included within the spirit and scope of the appended claims.

What is claimed is:

1. A sealing member having a magnet for attachment along a periphery of a door or an opening portion which is closed and opened by the door, comprising:

a base portion:

a tubular seal portion which expands from said base portion and is surrounded by a seal wall, said seal wall having a contacting part which is to contact the opening portion or the periphery of the door upon closing of the door; and a bar-shaped magnet, which is provided in said tubular seal portion, wherein said bar-shaped magnet extends in a longitudinal direction of said seal portion, and said bar-shaped magnet contacts an inside surface of said contacting part of said seal wall, wherein said bar-shaped magnet has an outwardly curving contacting surface on the side of said contacting part of said seal wall of said tubular seal portion, and the width of the cross-sectional shape of said bar-shaped magnet gradually decreases from the side of said contacting part of said seal wall inwardly of said tubular seal portion.

2. A sealing member as claimed in claim 1, wherein said bar-shaped magnet is composed of a mixture of a material composing said tubular seal portion, and a magnetic material.

3. A sealing member as claimed in claim 1, wherein said tubular seal portion has a partition wall which is integrally formed with said seal wall so as to define a tubular space with said contacting part of said seal wall, and said bar-shaped magnet is accommodated in said tubular space.

4. A sealing member as claimed in claim 1, wherein said contacting part of said seal wall is formed thinner than a remaining part of said seal wall.

5. A sealing member as claimed in claim 1, wherein said tubular seal portion has a narrow part in about the middle in the height direction of the tubular seal portion, and said bar-shaped magnet is provided in an upper half of said tubular seal portion.

6. A sealing member as claimed in claim 5, further comprising a plurality of sponge members which are provided in said tubular seal portion so as to extend in a longitudinal direction thereof in contact with an inside surface of said seal wall of said tubular seal portion.

\* \* \* \* \*